United States Patent
Rich et al.

(10) Patent No.: US 7,127,596 B2
(45) Date of Patent: Oct. 24, 2006

(54) METHOD AND SYSTEM FOR IMPROVING COMPUTER SYSTEM BOOT RELIABILITY BY EXECUTING AN APPLICATION SPECIFIC TEST DURING A BOOT PRIOR LOADING AN OPERATING SYSTEM

(75) Inventors: Daniel A. Rich, Gilbert, AZ (US); Robert L. Huff, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 10/183,547

(22) Filed: Jun. 28, 2002

(65) Prior Publication Data

US 2004/0003222 A1     Jan. 1, 2004

(51) Int. Cl.
G06F 15/177     (2006.01)
G06F 12/16     (2006.01)

(52) U.S. Cl. .............................. 713/1; 713/2; 711/162

(58) Field of Classification Search ................ 713/1, 713/2, 100; 714/2, 7, 23, 24, 47, 48; 711/161, 711/162
See application file for complete search history.

(56) References Cited

U.S. PATENT DOCUMENTS

| | | | | | |
|---|---|---|---|---|---|
| 656,702 | A | * | 8/1900 | Gharda et al. | 473/49 |
| 5,708,776 | A | * | 1/1998 | Kikinis | 714/55 |
| 6,098,158 | A | * | 8/2000 | Lay et al. | 711/162 |
| 6,145,102 | A | * | 11/2000 | Klein et al. | 714/47 |
| 6,393,585 | B1 | * | 5/2002 | Houha et al. | 714/23 |

FOREIGN PATENT DOCUMENTS

JP     52128031 A  * 10/1977

* cited by examiner

Primary Examiner—Thomas Lee
Assistant Examiner—Suresh K Suryawanshi
(74) Attorney, Agent, or Firm—Kenyon & Kenyon LLP

(57) ABSTRACT

Embodiments of the invention provide for automatically resolving computer system boot-up problems and for ensuring the reliability of boot-up. According to embodiments, a test of a condition of a computer system may be performed prior to attempting to load an operating system, to ensure the reliability of the system. In other embodiments, a boot-up may be attempted from a plurality of different operating system images, in the event a boot-up from a given operating system image fails.

24 Claims, 3 Drawing Sheets

METHOD AND SYSTEM FOR IMPROVING COMPUTER SYSTEM BOOT RELIABILITY BY EXECUTING AN APPLICATION SPECIFIC TEST DURING A BOOT PRIOR LOADING AN OPERATING SYSTEM

FIELD OF THE INVENTION

Embodiments of the present invention relate to generally to computer systems, and more particularly to a method for improving computer system boot reliability.

BACKGROUND OF THE INVENTION

The term "boot" or "boot up" is commonly used to describe loading operating system software into a computer system. More specifically, booting may comprise a process including several operations culminating in the loading of an operating system into system RAM. In many well-known systems, the boot process may begin with the loading of a BIOS (Basic Input/Output System) program from a ROM (Read-Only Memory) device. After performing some self-testing operations, the BIOS typically loads and then branches to a program called a "boot loader" that will actually load the operating system software. The boot loader typically resides in a reserved location on the system hard disk, for example, in the starting sectors of the hard disk.

After the BIOS program branches to the boot loader, the boot loader typically loads system initialization files that then proceed to load the operating system. Such initialization files may be known as "kernels" or operating system (OS) "images." A kernel or OS image may specify a basic configuration of the OS, such which OS files need to be loaded. For example, an OS image could specify which device drivers needed to be loaded.

As is well known, during a typical OS boot process, the process can "hang"; i.e., the process may stop short of a complete, successful boot due to some hardware or software problem, such as a corrupted or missing OS image. Typically, the first approach to addressing the problem of a boot that fails to complete successfully is to re-boot the system, usually from the same OS image.

In many settings, re-booting the system is performed by a human user; i.e., a user manipulates some control means of the computer, such as a keyboard or reset button, to cause the re-boot to be initiated. However, in other settings such human intervention is not readily available. For example, a computer in a remote base station of a telecommunications network may not be easily accessible by a user in the event that a boot of the computer hangs.

It is known to attempt to re-boot the system automatically (i.e., without human intervention). However, in known systems, the re-boot may be continually attempted from the same OS image. If the OS image is corrupted, for example, this can lead to an infinite loop of system resets, making the system unusable.

Additionally, known boot routines do not perform a rigorous test of the condition of the devices of the hardware platform in which an OS is to be loaded, prior to loading the OS. Examples of such devices include memory controllers, Ethernet cards, serial I/O cards and custom ASICs (Application Specific Integrated Circuits). Thus, an OS may appear to boot successfully, while in fact one or more devices of the hardware platform may not be operating or may be operating in a sub-standard condition. This can lead to problems later on, as the OS begins to run application programs that require the inoperative or sub-standard devices. The problems may be worsened, for example, in settings as discussed above, where there is no human operator available to monitor the computer and take corrective action if needed.

A method and system are needed to address the problems outlined in the foregoing discussion.

DETAILED DESCRIPTION

Figure 1:
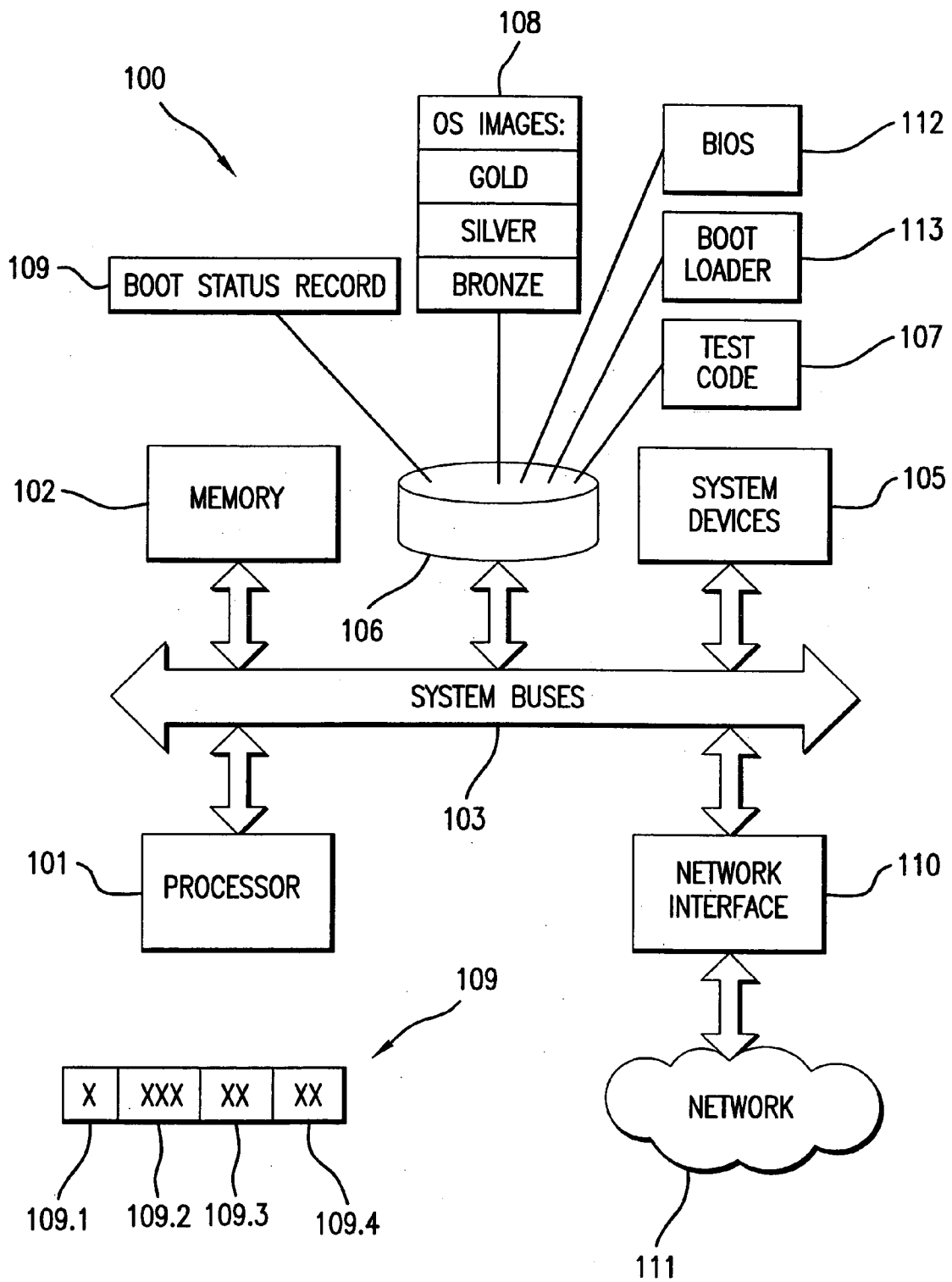
FIG. 1 shows one example of a possible computer system configuration wherein embodiments of the invention might find useful application.

Embodiments of the invention provide for automatically resolving computer system boot problems without human intervention and for improving the reliability of a computer system that does successfully load an OS. According to embodiments of the invention, a method and system are provided wherein, during a boot of a computer system and prior to loading an operating system (OS) of the system, a test of a condition of the computer system is executed. The test may be designed to be application-specific; i.e., depending on what kind of application or applications are intended to be run on the computer system, certain predetermined criteria may or may not need to be satisfied.

Depending on the results of the test, one or more predetermined responsive actions may be taken automatically (i.e., without user intervention). For example, if the test is passed, according to first predetermined criteria, the OS may be loaded and the computer system may go on to run applications, with a reasonable certainty that system will operate reliably. On the other hand, if the test is not passed according to the first predetermined criteria, the computer may automatically be caused to attempt some corrective action based on second predetermined criteria. For example, the computer may be caused to be rebooted, without proceeding to attempt to load the OS. The re-boot alone, by resetting various devices of the computer system, may resolve the initial problem, enabling the test to be passed during the re-boot. If the test is passed, the boot process may proceed to load the OS. Other examples of predetermined responsive actions that may be performed depending on results of the test and the second predetermined criteria include loading a different OS image, entering a diagnostic mode, or even shutting the system down.

Advantages provided by the foregoing embodiments include that by testing the computer system prior to loading the OS, it may be assured to a measurable degree that the system is operational as required for particular applications. By contrast, as noted above, in known systems, even though some pre-OS load testing may be performed, an OS may successfully be loaded even though devices of the system may be operating in a sub-standard condition. For example, BIOS performs some testing before the OS is loaded, but because BIOS is intended mainly for the PC market, it applies only generalized testing, involving only the writing of some simple test patterns to system memory and checking to see whether the memory responds correctly. BIOS is not known to perform in-depth testing of peripheral devices, for example. Additionally, BIOS is not known to be application-specific. For example, BIOS code has no detailed knowledge of custom devices, such as custom ASICs, which may be present on a computer platform and whose performance may be critical to particular applications intended to be run on the platform.

By automatically performing a predetermined responsive action based on second predetermined criteria as described above in the event that the test is not passed according to first predetermined criteria, a need for user intervention may be avoided. Additionally, because the test may be application-specific, it may be determined that a computer system is usable and that the OS may be fully loaded if the only devices that fail the test are not critical to the application. Or, it may be determined, for example, based on the second predetermined criteria, that the computer system is usable by one OS image but not another, and the OS image that is able to use the computer system may be loaded.

According to alternative embodiments of the invention, without necessarily first performing a test of a condition of a computer system as described above, a boot of a computer system may be attempted from a first OS image, and if the boot from the first OS image does not complete successfully, a re-boot may automatically be attempted from a second OS image different from the first OS image. To facilitate a decision as to whether to attempt to boot from the second OS image, embodiments may further provide a boot status record to record whether the computer system has failed to boot successfully in an earlier attempt. The computer system may automatically be caused to attempt to boot from a first OS image a predetermined number of times before it is decided to attempt to boot from a different OS image.

The foregoing embodiments offer advantages including avoiding a need for user intervention in the event of an unsuccessful boot. By automatically falling back to a second OS image different from a first OS image that failed to successfully boot, the probability of a boot that is eventually successful is increased.

FIG. 1 shows a block diagram of a computer system 100 wherein embodiments of the present invention might be advantageously used. Computer system 100 represents a "platform" for running application programs. As is commonly understood, the term "platform" refers generally to the hardware and software components needed to support the execution of application programs.

As shown in FIG. 1, computer system 100 comprises a memory 102 which may be configured to store computer-executable instructions, and a processor 101 configured to execute instructions stored in the memory 101. Computer system 100 may further comprise system devices 105 and storage 106. System devices 105 may include, for example, control devices such as a memory controller and peripheral I/O devices such as Ethernet cards, serial I/O cards and custom ASICs. Storage 106 is intended to represent any of the various forms storage media for storing digital data might take in a computer system, including, for example, RAM and ROM, disk storage, flash memory, and the like. Computer system 100 may further comprise a network interface 110 to enable communication with a network 111. Components of computer system 100 may communicate with each other via system buses 103.

Storage 106 may comprise test code 107, BIOS code 112, boot loader code 113, a plurality of different OS images 108, and a boot status record 109 as discussed in more detail below.

Figure 2:
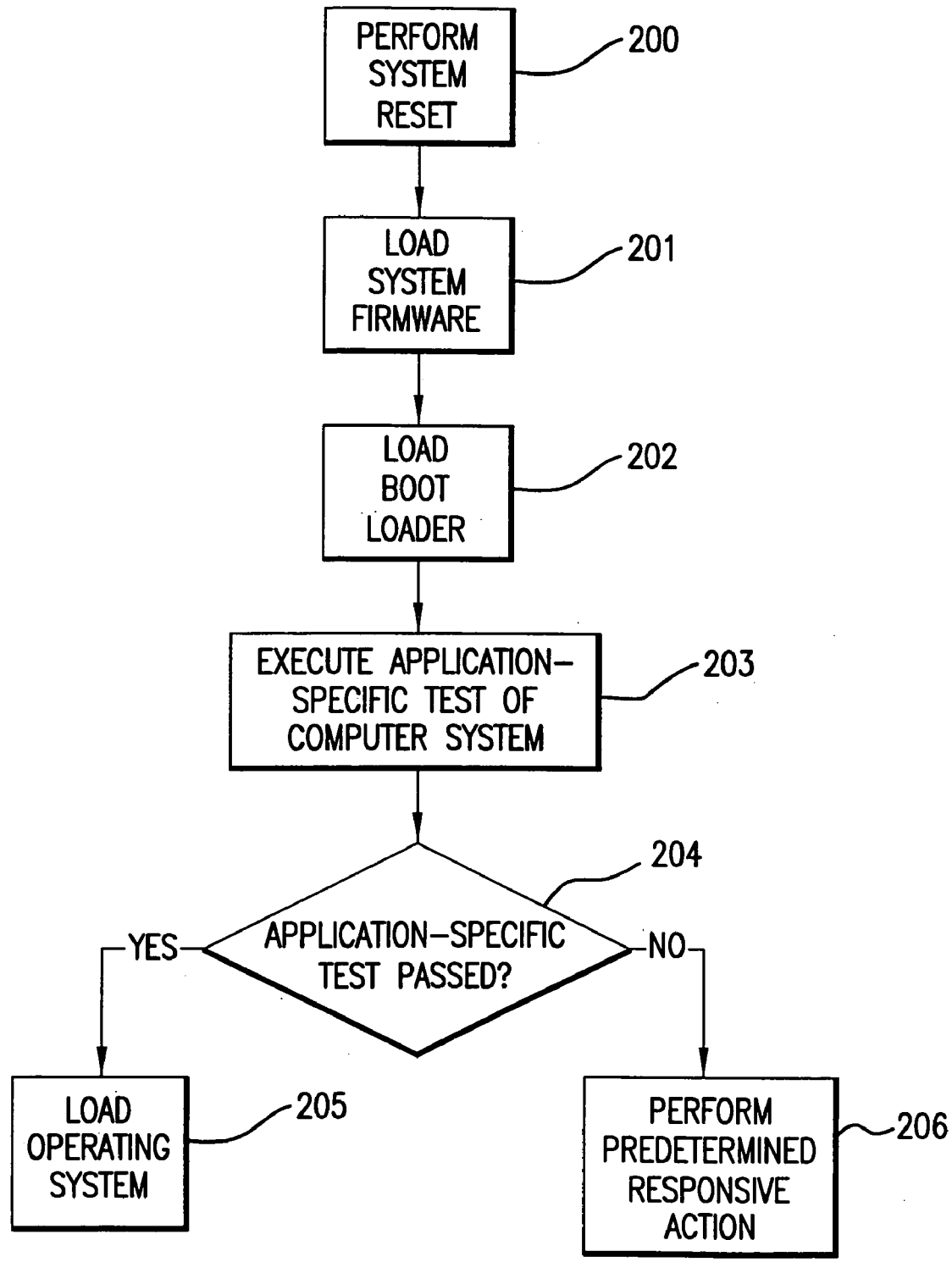
FIG. 2 shows a process flow according to embodiments of the invention.

FIG. 2 shows a process flow according to embodiments of the invention, which may be implemented using a computer system such as computer system 100. The computer system may be configured to execute instructions stored in a memory such as memory 101, to automatically (i.e., without human intervention) effect operations of the processor as described hereinafter. The instructions could, for example, be included partly in BIOS code 112 and partly in boot loader code 113. The operations may comprise automatically performing a system reset of the computer system, as shown in block 200. A system reset may comprise powering down the computer system, and then powering it up again. Next, low-level code, or system "firmware" may be loaded as shown in block 201. The operations of performing a system reset and loading system firmware may of themselves be enough to correct transient problems in the computer system that might otherwise adversely affect system operations.

Boot loader code 113 may then be loaded as shown in block 202. Then, according to embodiments of the invention, prior to loading an OS, an application-specific test of the computer system may be executed as shown in block 203. Referring to FIG. 1, test code 107 comprising computer-executable instructions for implementing the test may reside, for example, on a hard disk or flash memory such as storage 106. Test code 107 could, for example, be integrated into boot loader code of the system.

Test code 107 may comprise instructions which when executed apply a test to the computer system to determine its readiness for supporting applications to be run once an OS is loaded. The test may comprise, for example, the application of stimuli to logic circuitry of the computer system, and it may be determined whether the logic circuitry responds correctly to the stimuli. The test may be based on functions that the logic circuitry is configured to perform. For example, test code 107 may cause selected system devices, such as a memory controller, an Ethernet card, a serial I/O card, or various custom ASICs to attempt to execute operations which they would normally need to execute to support applications running on a fully operational system. However, as noted earlier, test code 107 may be made application-specific, and therefore the test code may include first predetermined criteria established to decide what constitutes successfully passing the test depending on what applications are intended to be run on the computer system. For example, a given application may require serial and Ethernet capability, and therefore a test may be designed to ensure that devices that provide these capabilities are performing adequately.

On the other hand, a different computer system might be used for applications which require only Ethernet capability, but no serial capability. Or, for example, newer versions of a given application that had previously required both serial and Ethernet capability might no longer need serial capability. In such cases, the test could be designed to test only for Ethernet capability. In this way, computer systems which might not be fully operational in the sense that every device of the systems was adequately functional could still be used.

According to embodiments, the first predetermined criteria could be "rules-based." That, the first predetermined criteria could comprise a set of rules for determining whether the test was successfully passed. The rules could have an "IF-THEN-ELSE" structure. For example, a rule according to the first predetermined criteria might be stated as "IF device X is at least 75% operational, THEN load the default OS, ELSE apply second predetermined criteria."

In view of the foregoing, the test code could further include second predetermined criteria established to decide what predetermined responsive action to perform if the test is not passed according to the first predetermined criteria. By applying the second predetermined criteria, a decision, for example, that could be made based on the test results is that while a particular system might not be in a condition that would allow a given OS image to be loaded and function properly, that system might allow a different OS image to be loaded and still obtain satisfactory functionality. Like the first predetermined criteria, the second predetermined criteria could be rules-based with an IF-THEN-ELSE structure. Thus, for example, a rule according to the second predetermined criteria might be stated as "IF device X is at least 75% operational, THEN load an alternative OS, ELSE reboot the system."

Other examples of predetermined responsive actions that may be taken based on the second predetermined criteria include entering a diagnostic mode, or shutting the system down. The diagnostic mode could include executing diagnostic code simply to obtain more information on which to base a decision according to the second predetermined criteria. For example, based on diagnostic code executed in the diagnostic mode, it could be determined that the system is in poor enough condition that it should simply be shut down. Alternatively, based on diagnostic code executed in the diagnostic mode, it could be determined that whatever condition led to the test being failed according to the first predetermined criteria is correctable. The diagnostic code could include code for correcting such correctable conditions. Thus, for example, a rule according to the second predetermined criteria might alternatively be stated as "IF results of the test are Y or Z, THEN execute diagnostic code to obtain more information; ELSE shut the system down."

The application-specific test, first predetermined criteria and the second predetermined criteria are arbitrary and modifiable, and typically would be user-tailored to fit specific, varied hardware and software configurations, based on user knowledge, for example, about what applications are intended to be run, system parameters and capabilities, and the like.

Accordingly, as shown in block 204, it may be determined whether the test was passed based on the first predetermined criteria. If the test is passed, the process may go on to load the OS, as shown in block 205. On the other hand, if the test is not passed according to the first predetermined criteria, a predetermined responsive action may be automatically performed based on the second predetermined criteria, as shown in block 206.

According to alternative embodiments of the invention, a history of failed boot attempts of a computer system may be maintained, so that corrective action may be taken upon subsequent boot attempts. The corrective action may include automatically attempting to boot the system from a series of different system images. The computer system may automatically be caused to attempt to boot from a given OS image a predetermined number of times before it is decided to attempt to boot from a different OS image.

Keeping a record of a failed boot attempt and performing a predetermined action upon the detection of a previous failed boot attempt is known in the art. For example, Windows® OS software provides for booting in a "safe mode" upon the detection of a previous failed boot attempt. However, the "safe mode" does not include automatically performing a self-correcting process according to embodiments of the invention as described in more detail below. Rather, the "safe mode" requires user intervention.

Figure 3:
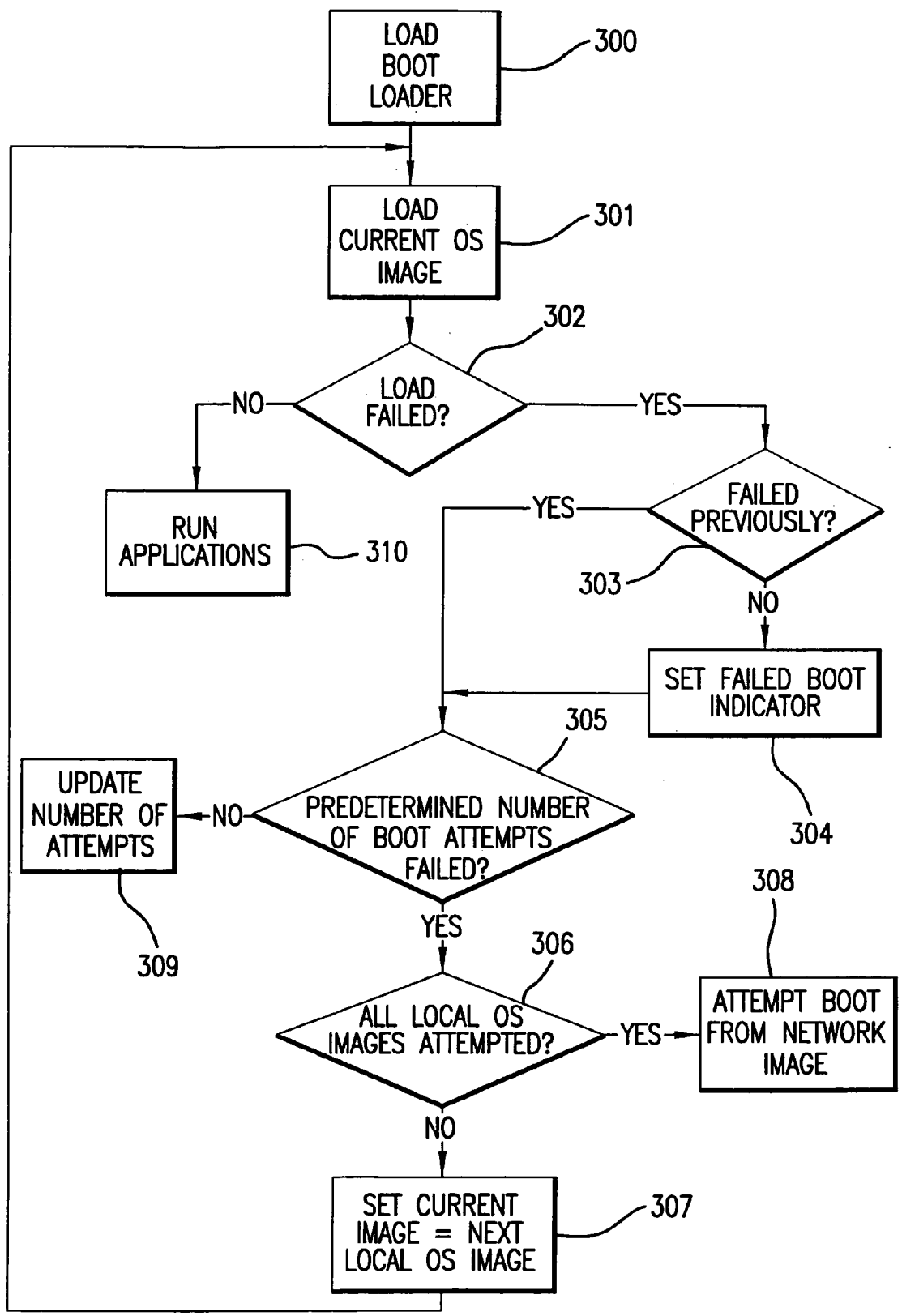
FIG. 3 shows another process flow according to alternative embodiments of the invention.

A process according to the alternative embodiments is shown in FIG. 3. After a boot loader is loaded as shown in block 300, an attempt may be made to load a current or default OS image as shown in block 301. As shown in block 302, if the load of the current OS image is successful, the computer system may go on to run applications as shown in block 310. However, the attempt to load the current OS image may fail, due, for example, to a corrupted OS image. If the attempt to load the current OS image fails, it may be determined whether a failed boot has previously occurred as shown in block 303. This operation may be implemented, for example, by providing a boot status record 109, as illustrated in FIG. 1, in non-volatile storage of the computer system, for example, a flash memory. The boot status record may include an indicator to indicate whether a previous boot attempt has failed.

One possible format for the boot status record 109 is further illustrated in FIG. 1. The boot status record may, for example, be of a length of a byte (8 bits). A first field 109.1 of the boot status record may be a failed boot indicator to indicate whether a previously attempted boot failed. A second field 109.2 may be reserved for special purposes as they arise. A third field 109.3 may contain a count of the number of times a boot from a particular OS image has been attempted. A fourth field 109.4 may identify which of a plurality of different available OS images the system is being booted from.

As shown in block 303, if an attempted boot has previously failed, the process may proceed to block 305. If an attempted boot has not previously failed, the failed boot indicator field 109.1 may be updated to indicate that a failed boot has occurred, as shown in block 304. Then, the process may continue to block 305.

In block 305, it may be determined whether a predetermined number of boots from the same OS image have been attempted. This may be implemented, for example, by storing a predetermined number of boots that may be attempted in field 109.3 of the boot status record. If the predetermined number of boots have not yet been attempted, the process may proceed to block 309, wherein the number of attempts may be updated. This may be implemented, for example, by decrementing the number in field 109.3 of the boot status record. Then, the process may attempt to boot again from the current OS image.

If, on the other hand, the predetermined number of boots has been attempted from the current OS image (as indicated, for example, by the value in field 109.3 being decremented to zero), it may next be determined whether boots have been attempted from all available local OS images, as shown in block 306. In the example shown in FIG. 1, there are three available different OS images in the system storage 106, arbitrarily designated "gold," "silver" and "bronze" for purposes of illustration.

If boots have not been attempted from each of all local OS images, then the OS image from which the next boot is to be attempted may be changed to the next available local OS image, as shown in block 307. This next available local image then becomes the "current" image, and the process may return to block 301 to boot the current image. When the OS image is changed, the failed boot indicator 109.1 and the count of attempted boots 109.3 may be reset and the OS image field 109.4 of the boot status record 109 may be updated accordingly.

If, instead, all local OS images have been tried, as shown in block 308 a boot may be attempted from an OS image or images accessible via network interface 110 and network 111 as illustrated in FIG. 1.

As an illustrative example, the process shown in FIG. 3 might first attempt to load the "bronze" image. The number of boots to attempt could be set to a predetermined value of, say, 5, in field 109.3 of the boot status record. The first attempt to load the "bronze" image might fail, and accordingly the failed boot indicator field 109.1 would be set to indicate a failed boot. The value in field 109.3 would be decremented by one. Then, another attempt would be made to load the "bronze" image.

This process might continue until 5 attempts to load the "bronze" image had failed. At this point, the failed boot indicator 109.1 would be reset, the value in field 109.3 would be reset to "5" and the OS image field 109.4 would be updated to specify the "silver" image. A load of the "silver" image could succeed, or could fail up to 5 times. If the attempted load of the "silver" image failed 5 times, up to 5 attempts to load the "gold" image would be made, and so on.

It may be readily appreciated that the processes illustrated in FIGS. 2 and 3 could be combined in various ways to form additional embodiments. For example, one possible predetermined action as represented in block 206 of FIG. 2 could include some or all of the process illustrated in FIG. 3. If the process of FIG. 3 failed to result in a successfully loaded OS, a different predetermined responsive action of block 206 could be performed, such as entering a diagnostic mode or shutting the system down. Alternatively, for example, the "no" branch of block 306 of FIG. 3 could be followed by blocks 203 and 204 of FIG. 2. That is, if a load of one OS image failed, a rigorous application-specific test of the computer system could be performed in order to determine what OS image to attempt to load next.

Generally, however, the process illustrated in FIG. 3 need not be preceded by the process in FIG. 2, nor need it include operations illustrated in FIG. 2.

In view of the above-described features, embodiments of the invention may be advantageously used, for example, in systems such as telecommunication networks. Telecommunication networks often comprise widely scattered stations having pluralities of computers to support telecommunication applications. Moreover, in the commercial market for such networks, high availability is an absolute requirement. One measure of availability that is often referred to in the field is "five-nines" availability, wherein a network can have at most only a few minutes of down time per year. Usually, it is impractical to have human operators at every station site to resolve boot-up problems, or to continuously monitor system devices to ensure that they are meeting application needs, even though the OS may be successfully loaded. Accordingly, embodiments of the present invention provide for automatically resolving boot-up problems without the need for human intervention, and for ensuring the reliability of systems that do successfully load an OS. It may further be appreciated that existing art that does include some generalized system pre-testing without automated self-correction, such as BIOS, is completely inadequate to meet the requirements of telecommunications networks.

Software comprising computer-executable instructions according to embodiments of the present invention may be stored and transported on a computer-usable medium such as diskette, magnetic tape, disk or CD-ROM. The instructions may be downloaded to another storage medium such as a memory 101 on system 100, from which they may be fetched and executed by a processor 102 of system 100 to effect the advantageous features of the invention.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:
   during a boot of a computer system, executing an application-specific test of a condition of said computer system, prior to loading an operating system;
   applying first criteria to determine whether said application-specific test was passed; and
   if said test was not passed according to said first criteria, automatically causing said computer system to perform a predetermined responsive action according to second predetermined criteria.

2. The method of claim 1, wherein said predetermined responsive action includes re-booting said computer system.

3. The method of claim 1, wherein said predetermined responsive action includes loading another operating system.

4. The method of claim 1, wherein predetermined responsive action includes entering a diagnostic mode.

5. The method of claim 1, wherein said test comprises applying a stimulus to a device of said computer system and determining whether said device responds correctly.

6. The method of claim 1, further comprising completing a load of said operating system if said application-specific test is passed.

7. A method comprising:
   attempting to load a first operating system image in a computer system, the first operating system image being one of plurality of locally-stored alternative operating system images; and
   if said first operating system image is not successfully loaded, performing an application-specific test on said computer system; and
   determining based on said application-specific test which of said plurality of locally-stored alternative operating system images to attempt to load next.

8. The method of claim 7, further comprising setting an indicator to indicate a failed load of said first operating system image.

9. The method of claim 7, further comprising automatically attempting to load said first operating system image a predetermined number of times before attempting to load a second operating system image.

10. The method of claim 7, further comprising attempting to load a second operating system image from a network.

11. A computer system comprising:
    computer-executable instructions stored in a memory;
    a processor coupled to said memory to execute said instructions; and
    logic circuitry configured to perform a set of functions;
    wherein said instructions are configured to be executed during a boot of said computer system and prior to loading an operating system of said computer system, to apply an application-specific test to determine whether said logic circuitry meets first predetermined criteria before loading said operating system, and, if said application-specific test is not passed according to said first criteria, to automatically cause said computer system to perform a predetermined responsive action according to second predetermined criteria.

12. The computer system of claim 11, wherein said predetermined responsive action includes re-booting said computer system.

13. The computer system of claim 11, wherein said predetermined responsive action includes loading another operation system.

14. The computer system of claim 11, wherein predetermined responsive action includes entering a diagnostic mode.

15. A computer system comprising,
computer-executable instructions stored in a memory; and
a processor coupled to said memory to execute said instructions;
wherein said instructions are configured to attempt a load of a first operating system image, the first operating system image being one of plurality of locally-stored alternative operating system images; and
if said attempted load fails, to perform an application-specific test on said computer system, and determine based on said application-specific test which of said plurality of locally-stored alternative operating system images to attempt to load next.

16. The computer system of claim 15, further comprising an indicator to indicate a failed load of said first operating system image.

17. The computer system of claim 15, wherein said instructions are further configured to automatically attempt to load said first operating system image a predetermined number of times before attempting to load a second operating system image.

18. A machine-readable medium tangibly embodying computer-executable instructions, said instructions when executed by a processor implementing a process comprising:
during a boot of a computer system, executing an application-specific test of a condition of said computer system, prior to loading an operating system;
applying first criteria to determine whether said application-specific test was passed; and
if said test was not passed according to said first criteria, automatically causing said computer system to perform a predetermined responsive action according to second predetermined criteria.

19. The machine-readable medium of claim 18, wherein said predetermined responsive action includes re-booting said computer system.

20. A machine-readable medium tangibly embodying computer-executable instructions, said instructions when executed by a processor implementing a process comprising:
attempting to load a first operating system image in a computer system, the first operating system image being one of plurality of locally-stored alternative operating system images;
performing an application-specific test on said computer system; and
determining based on said application-specific test which of said plurality of locally-stored alternative operating system images to attempt to load next.

21. The machine-readable medium of claim 20, wherein said process further comprises automatically attempting to load said first operating system image a predetermined number of times before attempting to load a second operating system image.

22. A method comprising:
during a boot of a computer system, executing an application-specific test of a condition of said computer system, prior to loading a first operating system image;
determining whether said application-specific test was passed; and
if said application-specific test was not passed, automatically attempting to load a second operating system image different from said first operating system image.

23. The method of claim 22, further comprising setting an indicator to indicate a failed load of said first operating system image.

24. The method of claim 22, further comprising automatically attempting to load said first operating system image a predetermined number of times before attempting to load said second operating system image.

* * * * *